United States Patent
Yang et al.

(10) Patent No.: US 11,916,843 B2
(45) Date of Patent: Feb. 27, 2024

(54) TECHNIQUES FOR TRIGGERING CSI REPORT ON PUSCH BASED ON DOWNLINK GRANT SIGNALING

(71) Applicant: QUALCOMM Incorporated, San Diego, CA (US)

(72) Inventors: Wei Yang, San Diego, CA (US); Wanshi Chen, San Diego, CA (US); Yi Huang, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 171 days.

(21) Appl. No.: 17/392,000

(22) Filed: Aug. 2, 2021

(65) Prior Publication Data

US 2022/0052826 A1     Feb. 17, 2022

Related U.S. Application Data

(60) Provisional application No. 63/064,162, filed on Aug. 11, 2020.

(51) Int. Cl.
*H04L 5/00*     (2006.01)
*H04W 72/23*     (2023.01)

(52) U.S. Cl.
CPC .......... *H04L 5/0057* (2013.01); *H04W 72/23* (2023.01)

(58) Field of Classification Search
CPC ............................ H04L 5/0057; H04W 72/23
USPC ........................................................ 370/329
See application file for complete search history.

(56) References Cited

U.S. PATENT DOCUMENTS

| | | | |
|---|---|---|---|
| 2013/0100906 A1* | 4/2013 | Yano | H04L 1/0027 370/329 |
| 2013/0322393 A1 | 12/2013 | Kishiyama | |
| 2019/0174466 A1* | 6/2019 | Zhang | H04L 5/0057 |
| 2019/0215119 A1* | 7/2019 | Kim | H04L 5/0048 |
| 2022/0061067 A1* | 2/2022 | Andersson | H04W 72/23 |
| 2023/0074723 A1* | 3/2023 | Alfarhan | H04L 1/1685 |

OTHER PUBLICATIONS

International Search Report and Written Opinion—PCT/US2021/044335—ISA/EPO—dated Nov. 11, 2021.

* cited by examiner

*Primary Examiner* — Christopher R Crompton
(74) *Attorney, Agent, or Firm* — Arent Fox, LLP

(57) ABSTRACT

Aspects of the present disclosure provide techniques for triggering generation and transmission of a channel state information (CSI) report by the user equipment (UE) on physical uplink shared channel (PUSCH) in response to issuance of at least one downlink grant by the base station.

27 Claims, 7 Drawing Sheets

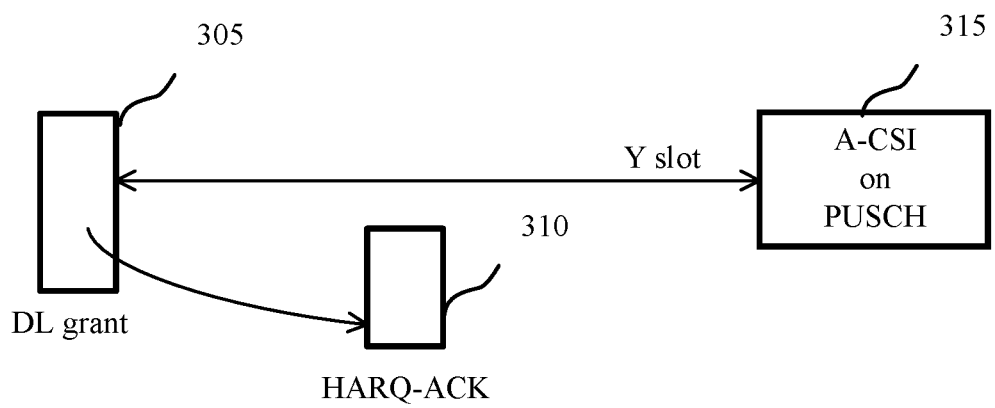

TECHNIQUES FOR TRIGGERING CSI REPORT ON PUSCH BASED ON DOWNLINK GRANT SIGNALING

CROSS-REFERENCE TO RELATED APPLICATION(S)

The present application claims benefit of U.S. Provisional Application No. 63/064,162 entitled "TECHNIQUES FOR TRIGGERING CSI REPORT ON PUSCH BASED ON DOWNLINK GRANT SIGNALING" filed Aug. 11, 2020, which is assigned to the assignee hereof and hereby expressly incorporated by reference herein

TECHNICAL FIELD

The present disclosure relates to wireless communication systems, and more particularly, to techniques for triggering transmission of channel state information (CSI) report on physical uplink shared channel (PUSCH) based on a downlink grant signaling transmitted by a base station.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for triggering generation and transmission of a channel state information (C I) report by the user equipment (UE) on physical uplink shared channel (PUSCH) in response to issuance of at least one downlink grant by the base station.

In one example, a method for wireless communication implemented by a UE is disclosed. The method may include receiving, at a user equipment (UE), a downlink grant message from a base station, wherein the downlink grant message includes a channel state information (CSI) report request. The method may further include generating the CSI report in response to the downlink grant message, wherein the CSI report is generated by measuring channel conditions between the base station and the UE. The method may further include transmitting the CSI report from the UE to the base station on a physical uplink shared channel (PUSCH).

In another example, an apparatus for wireless communications. The apparatus may include a memory having instructions and a processor configured to execute the instructions to receive, at a UE, a downlink grant message from a base station, wherein the downlink grant message includes a CSI report request. The process may further be configured to execute the instructions to generate the CSI report in response to the downlink grant message, wherein the CSI report is generated by measuring channel conditions between the base station and the UE. The process may further be configured to execute the instructions to transmit the CSI report from the UE to the base station on a PUSCH.

In some aspects, a non-transitory computer readable medium includes instructions stored therein that, when executed by a processor, cause the processor to perform the steps of receiving, at a UE, a downlink grant message from a base station, wherein the downlink grant message includes a CSI report request. In some examples, the processor may further perform the steps of generating the CSI report in response to the downlink grant message, wherein the CSI report is generated by measuring channel conditions between the base station and the UE. The processor may further perform the steps of transmitting the CSI report from the UE to the base station on a PUSCH.

In certain aspects, another apparatus for wireless communication is disclosed. The apparatus may include means for receiving, at a UE, a downlink grant message from a base station, wherein the downlink grant message includes a CSI report request. The apparatus may further include means for generating a CSI report based on receiving one or both of the first scheduling grant message or the second scheduling grant message. The apparatus may further include means for generating the CSI report in response to the downlink grant message, wherein the CSI report is generated by measuring channel conditions between the base station and the UE. The apparatus may further include means for transmitting the CSI report from the UE to the base station on a PUSCH.

In another example, another method implemented by a base station is disclosed. The method may include generating, at a base station, a downlink grant message from a base station, wherein the downlink grant message includes a CSI report request. The method may further include transmitting the downlink grant message from the base station to a UE. The method may further include receiving a CSI report from the UE on a PUSCH.

In another example, an apparatus for wireless communications. The apparatus may include a memory having instructions and a processor configured to execute the instructions to generate, at a base station, a downlink grant message from a base station, wherein the downlink grant message includes a CSI report request. The processor configured to execute the instructions to transmit the downlink grant message from the base station to a UE. The processor configured to execute the instructions to receive a CSI report from the UE on a PUSCH.

In some aspects, a non-transitory computer readable medium includes instructions stored therein that, when executed by a processor, cause the processor to perform the steps of generating, at a base station, a downlink grant message from a base station, wherein the downlink grant message includes a CSI report request. In some examples, the processor may further perform the steps of transmitting the downlink grant message from the base station to a UE. The processor may further perform the steps of receiving a CSI report from the UE on a PUSCH.

In certain aspects, another apparatus for wireless communication is disclosed. The apparatus may include means for generating, at a base station, a downlink grant message from a base station, wherein the downlink grant message includes a CSI report request. The apparatus may further include means for transmitting the downlink grant message from the base station to a UE. The apparatus may further include means for receiving a CSI report from the UE on a PUSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
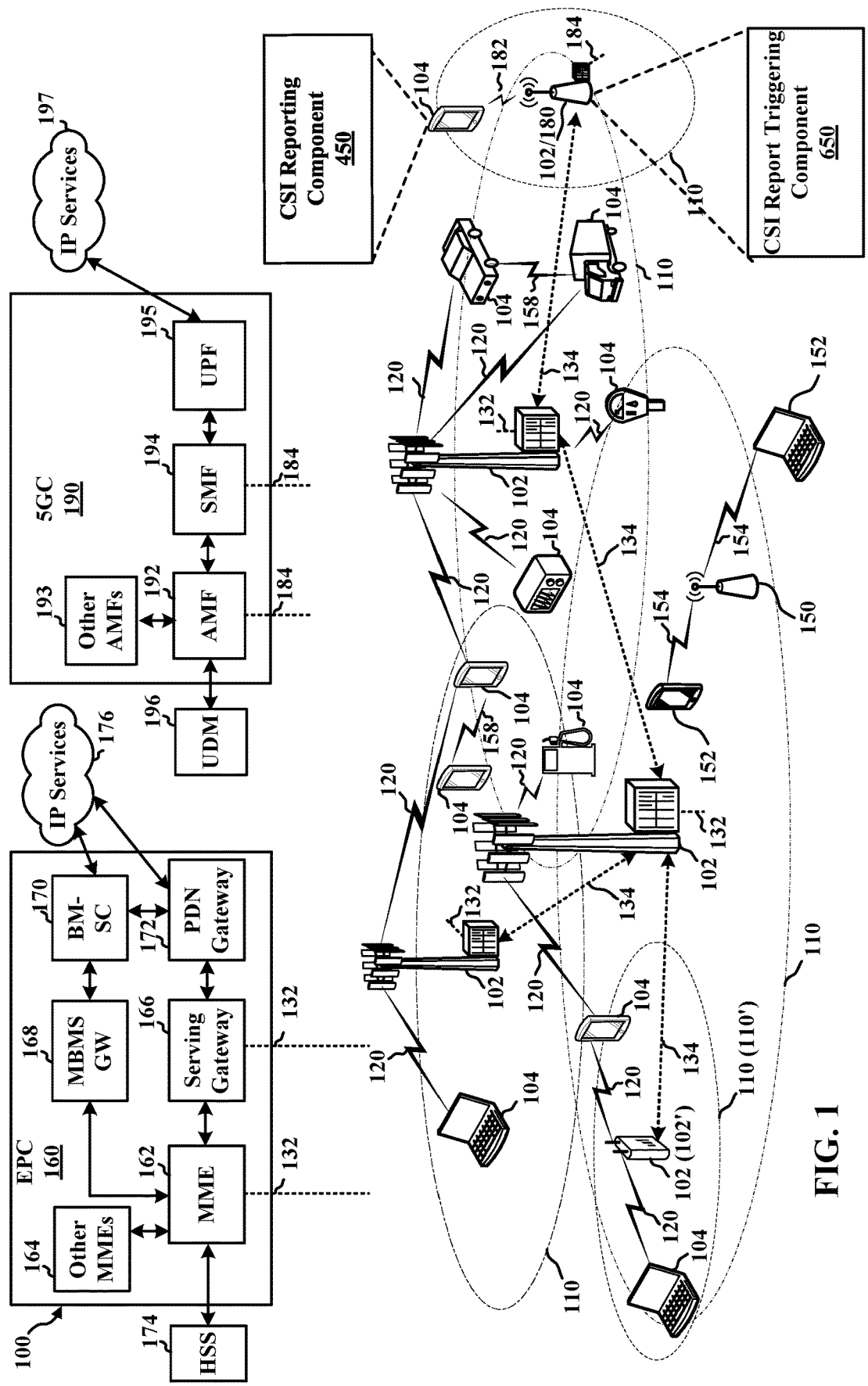
FIG. 1 is a schematic diagram of an example of a wireless communications system in accordance with aspects of the present disclosure.

In wireless communication systems, base stations may schedule the UE to transmit an aperiodic channel state information (A-CSI) report on physical uplink shared channel (PUSCH) using an uplink grant. In recent years, however, with the introduction of a myriad of smart handheld devices, user demands for mobile broadband has dramatically increased. To this end, in emerging wireless systems such as with the 5G communications technology, the demand for downlink traffic (e.g., from base station to UE) is anticipated to far exceed the amount of uplink traffic (e.g., from the UE to base station). This is generally because of bandwidth-hungry applications such as video streaming and multimedia file sharing that are pushing the limits of current cellular systems.

In wireless communications, channel state information (CSI) refers to channel properties of a communication link. This information describes how a signal propagates from the transmitter to the receiver and represents the combined effect of, for example, scattering, fading, and power decay with distance. The method may be referred to as channel estimation. The CSI makes it possible to adapt the transmissions to current channel conditions, which may be crucial for achieving reliable communication with high data rates in wireless systems.

However, reliance on uplink grant triggers for A-CSI reporting may not be ideal in scenarios where the wireless traffic is disproportionally favored towards downlink transmissions. Indeed, limiting the CSI report trigger to uplink grant may require additional bandwidth resources and adversely impact latency between the base station and the UE. For example, by limiting the CSI report trigger to uplink grant may require additional bandwidth resources for the base station to separately trigger CSI reports using uplink grant. Thus, aspects of the present disclosure provide techniques for triggering generation and transmission of a A-CSI report by the UE in response to issuance of a downlink grant by the base station. Utilization of the downlink grant (as opposed to uplink grant) may enable faster A-CSI reporting than A-CSI reporting on PUSCH and may provide the base station with more up-to-date CSI information, which in turn may help improve downlink scheduling of data between the base station and the UE. Additionally, the downlink triggered CSI-RS report may also be supported for reduced latency and increased reliability.

Transmitting the A-CSI on a PUCCH, however, raises additional implementation challenges that require complicated techniques to resolve. For example, if the transmission of A-CSI on PUCCH overlaps with another PUCCH transmissions (including a second A-CSI or HARQ-ACK message) in a particular slot or sub-slots (collectively "transmission opportunity"), or if the transmission of A-CSI overlaps with another PUSCH transmission, then there may be instances of traffic collision. In addition, in order to ensure proper decoding of the A-CSI and overlapping PUCCH transmission by the base station, the payload size of the transmission after multiplexing (e.g., mux HARQ-ACK with A-CSI on PUCCH) must be collectively known to both the base station and the UE. For purposes of the present disclosure, the term "overlap" may refer to multiple transmissions occupying the same slot or sub-slot.

Additionally, in some cases, the downlink control information (DCI) that schedules the HARQ-ACK or A-CSI may be missing. For example, in some instances, a transmission by the base station of downlink grant or physical downlink shared channel (PDSCH) that requires HARQ-ACK may not be received by the UE due to poor channel conditions between the base station and the UE. In such instance, the base station may falsely anticipate receiving a multiplexed payload during a transmission opportunity from the UE that includes both A-CSI and HARQ-ACK multiplexed message or multiple A-CSIs (e.g., first CSI report and second CSI report). However, given that the UE may not have received at least one message (e.g., DCI) due to poor channel conditions, the UE may transmit either only the A-CSI or the HARQ-ACK in response to the transmissions by the base station. Such uplink payload may not be properly decoded by the base station because the base station may decode the payload as a multiplexed message, whereas the UE may have only transmitted one of A-CSI or the HARQ-ACK. The desynchronization between the UE and the base station in such instances may adversely impact the ability for the base station to receive and decode messages from the UE, including CSI reports.

In order to address such collisions and desynchronized issues that may arise due to missing DCI, systems may implement restrictions for A-CSI on PUCCH triggered by downlink grant. For example, the UE may be configured to restrict transmission of at most one A-CSI on PUCCH that overlaps on slot/sub-slot (e.g., transmission opportunity). In other instances, the UE may be restricted to receive at most one downlink grant on any one slot/sub-slot which triggers A-CSI on PUCCH in order to minimize possible collisions of multiple uplink transmissions on a single transmission opportunity. Such solutions, however, may be resource intensive, require coordination between base station and the UE, and require configuring each of the one or more UEs.

To this end, features of the present disclosure provide techniques for supporting downlink grant triggered A-CSI report on a PUSCH channel. One advantage of transmitting A-CSI on PUSCH may include minimizing implementation complexities that are prevalent in current systems as the UEs may be preconfigured to multiplex A-CSI on PUSCH with other uplink control information (UCI). Thus, in order to implement the current techniques, the base station may incorporate an A-CSI request field in the downlink grant message (e.g., scheduling grant message) transmitted to the UE. In some aspects, the UE may be configured with a list of CSI report configurations for each downlink serving cell or downlink bandwidth part (BWP) for A-CSI report on PUSCH.

Accordingly, each codepoint (except the all 0 codepoint) of the A-CSI request field may indicate a particular A-CSI report configuration that includes one or more CSI resources. The all "0" codepoint may signal to the UE that no A-CSI report is requested by a particular downlink grant message transmitted by the base station to the one or more UEs. Aspects of the present disclosure may also allow the DCI transmission from the base station to trigger CSI reports for CSI resources on different downlink serving cell from the cell that UE receives the downlink grant (e.g., allowing cross-carrier CSI-RS triggering). In other words, the DCI transmission for CSI report on a first component carrier may also trigger CSI reporting for CSI resources on a second component carrier. Features of the present disclosure also provide techniques for supporting a single downlink grant to trigger multiple CSI-reports on multiple serving cells with respective CSI-RS(s). Such features may be implemented by associating multiple CSI-report configurations with a single A-CSI trigger state that is included in the downlink grant in A-CSI request field. In such instances, the UE may multiplex the plurality of CSI reports and transmit the multiplexed CSI reports on the same PUSCH transmission, thereby further conserving bandwidth resources.

Upon receiving the downlink grant message from the base station that includes A-CSI request field, the UE may generate a A-CSI report to provide feedback to the base station. In some examples, a radio resource control (RRC) parameter (e.g., "reportConfigType") may be configured for one or more CSI-report configuration(s). The RRC parameter may indicate one or more of the types of CSI report that the UE may generate, including periodic CSI reports, semi-persistent CSI reports for transmission on PUSCH, semi persistent CSI reports for transmission on PUCCH, or aperiodic CSI reports.

In some aspects, additional CSI report configuration types (e.g., "AperiodicOnPUSCH-by-DCI-format-1_1," or "AperiodicOnPUSCH-by-DCI-format-1-2," or "AperiodicOnPUSCH-by-DCI-format1_1-1-2, or "AperiodicOnPUSCH-by-downlink-DCI") may be utilized to indicate that the CSI report configuration is for A-CSI report on PUSCH triggered by the downlink grant. In such scenario, the "AperiodicOnPUSCH-by-DCI-format-1_1" CSI report configuration may be triggered by the base station using DCI format 1_1, while the "AperiodicOnPUSCH-by-DCI-format-1_2" may be triggered by DCI format 1_2. Additionally or alternatively, "AperiodicOnPUSCH-by-DCI-format1_1-1-2" or "AperiodicOnPUSCH-by-downlink-DCI" may be triggered by both DCI formats 1_1 and 1_2.

In some aspects, the additional CSI report configuration types may be triggered only by the downlink grant and restricted from being used for uplink grant. In some aspects, for this additional CSI report configuration types, additional RRC parameters may be configured for every CSI report configuration. For example, an A-CSI report offset, a PUSCH resource used to transmit A-CSI, and/or beta factor (e.g., used for the UE to determine the coding rate for the A-CSI from the coding rate/MCS of the PUSCH) may be configured.

In some aspects, one or more of the following parameters may be configured for the PUSCH resources: frequency-Hopping, DMRS-Configuration, mcs-Table, resourceAllocation type {resourceAllocationType0, resourceAllocationType1}, rbg-Size, open-loop power control parameter: P0 and alpha, power control loop for closed-loop power control, transformPrecoder (i.e., whether to use DFT-S-OFDM or CP-OFDM), repetition factor, RV sequence in case repetition, time-domain resource allocation (within a slot), frequency-domain resource allocation, antenna port, DMRS sequence initialization, precoder and number of layers, frequency-hopping-offset, MCS, and/or SRS resource indicator. In some aspects the PUSCH resource may be configured in a same serving cell as the cell where the downlink grant is received by the UE. In some aspects, the PUSCH resource may be limited only to resources on the Pcell and/or the Pscell. Additionally or alternatively, one or more parameters noted above may be configured for a PUSCH resource.

Alternatively, in some aspects, instead of configuring new parameters for the PUSCH resource, the base station may configure an index for a configured grant (CG) PUSCH transmission for a A-CSI report on PUSCH configuration. In such instance, the UE may follow the parameters of the configured CG PUSCH to transmit the A-CSI on PUSCH. Specifically, in new radio, a UE may be configured with one or more PUSCH(s) with configured grant(s) where all transmission parameters are RRC configured for the PUSCH(s) transmissions. By using the CG PUSCH to transmit A-CSI, the gNB may avoid configure all the parameters discussed above, thereby saving resources and reducing implementation complexities.

In some examples, a single CSI resource setting may be associated with both uplink grant and downlink grant. In such scenario, an RRC parameter may be used to identify the trigger offset of the CSI-RS resource that may be used when the CSI resource is triggered by a DL grant (e.g., aperiodicTriggeringOffsetByDL_DCI). Alternatively, the base station may reuse the existing aperiodicTriggeringOffset (as for UL grant triggered A-CSI reports).

In some aspects, the HARQ process corresponding to the PUSCH transmission can be either RRC configured in the corresponding CSI-report configuration, dynamically indicated by the DL grant (e.g., reusing the same HARQ process as the DL HARQ process for the PUSCH transmission), or implicitly determined by the UE as a function of the slot on which the PUSCH is transmitted. In other scenarios where the PUSCH may also contains data, the retransmission of the data on PUSCH can be scheduled by an uplink grant DCI scrambled by a C-RNTI or a CS-RNTI and with the same HARQ process number as the HARQ process number as the initial transmission. In some aspects, the UE may be prevented from transmitting any data on the PUSCH during the transmission of the A-CSI report. In other words, in some scenarios, the PUSCH may only be used to transmit A-CSI.

Additionally or alternatively, aspects of the present disclosure provide techniques for controlling the power for A-CSI transmission on PUSCH by the UE. For example, downlink grants may contain a 2-bit transmit power control (TPC) field that may be used by the base station to indicate the transmit power for the PUSCH carrying HARQ-ACK feedback. In some instances, the same 2-bit TPC field in DCI may apply to both the PUCCH transmissions for HARQ-ACK and the PUSCH transmissions for A-CSI report. In other examples, separate TPC fields can be configured for the power control for HARQ-ACK and A-CSI. In such situations, the TPC for A-CSI may be used to indicate the closed-loop power control command for the A-CSI on PUSCH As noted above, in some aspects, the UE may be configured to restrict transmission of at most one A-CSI on PUSCH in a slot (e.g., transmission opportunity). In other instances, the UE may be restricted to receive at most one downlink grant on any one slot which triggers A-CSI on PUSCH in order to minimize possible collisions of multiple uplink transmissions on a single transmission opportunity.

For example, the UE may be restricted from being scheduled/triggered to transmit more than one A-CSI reports on PUSCHs in a slot across all configured UL serving cells. This may include transmission for both downlink grant triggered A-CSI reports on PUSCH and uplink grant triggered A-CSI reports on PUSCH.

Various aspects are now described in more detail with reference to the FIGS. 1-7. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some UEs 104 of the wireless communication system may have a modem 814 and a CSI reporting component 450 (see FIG. 4) for responding to CSI report trigger over PUSCH in response to the downlink grants issued by the base station and for performing the aspects of present disclosure. Additionally or alternatively, one or more base stations 102/180 may include CSI report triggering component 650 for issuing one or more scheduling grant messages (e.g., downlink and/or uplink grants) to trigger CSI reporting from the UE that are transmitted over PUSCH.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1)UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
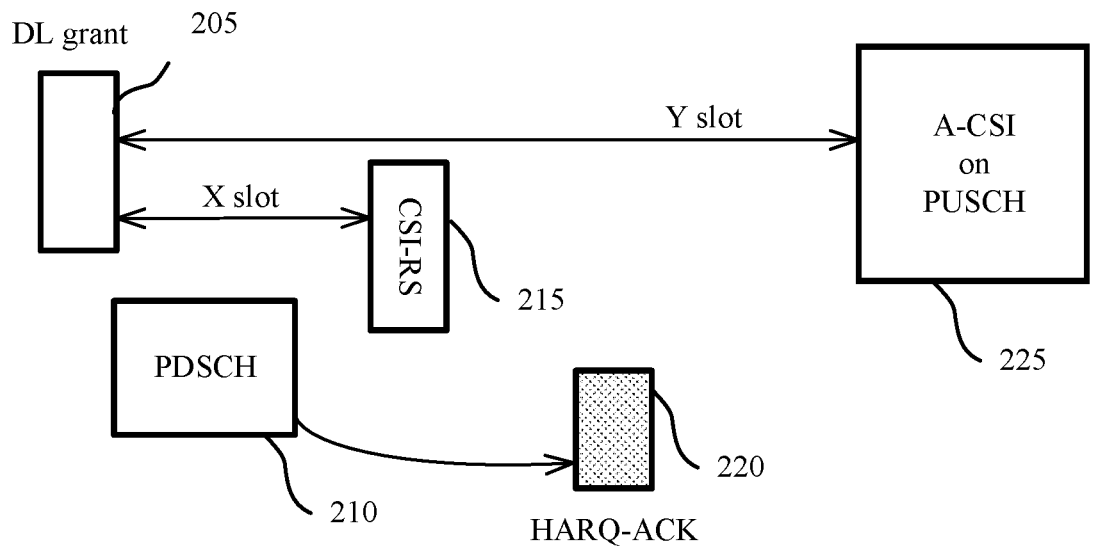
FIG. 2 is a timing diagram of an example of downlink grant trigger of CSI report transmission on PUSCH in accordance with aspects of the present disclosure.

FIG. 2 is a timing diagram 200 of an example of downlink grant trigger of CSI report transmission on PUSCH. Specifically, as noted above, features of the present disclosure provide techniques for supporting downlink grant triggered A-CSI report on a PUSCH channel. One advantage of transmitting A-CSI on PUSCH may include minimizing implementation complexities that are prevalent in current systems as the UEs may be preconfigured to multiplex A-CSI on PUSCH with other uplink control information (UCI). Thus, in order to implement the current techniques, the base station may incorporate an A-CSI request field in the downlink grant message (e.g., scheduling grant message) transmitted to the UE. In some aspects, the UE may be configured with a list of CSI report configurations for each downlink serving cell or downlink bandwidth part (BWP) for A-CSI report on PUSCH.

Accordingly, each codepoint (except the all 0 codepoint) of the A-CSI request field may indicate a particular A-CSI report configuration that includes one or more CSI resources. The all "0" codepoint may signal to the UE that no A-CSI report is requested by a particular downlink grant message transmitted by the base station to the one or more UEs. Aspects of the present disclosure may also allow the DCI transmission from the base station to trigger CSI reports for CSI resources on different downlink serving cell from the cell that UE receives the downlink grant (e.g., allowing cross-carrier CSI-RS triggering). In other words, the DCI transmission for CSI report on a first component carrier may also trigger CSI reporting for CSI resources on a second component carrier. Features of the present disclosure also provide techniques for supporting a single downlink grant to trigger multiple CSI-reports on multiple serving cells with respective CSI-RS(s). Such features may be implemented by associating multiple CSI-report configurations with a single A-CSI trigger state that is included in the downlink grant in A-CSI request field. In such instances, the UE may multiplex the plurality of CSI reports and transmit the multiplexed CSI reports on the same PUSCH transmission, thereby further conserving bandwidth resources.

To this end, in some examples, the UE 104 may receive a downlink grant message 205 from the base station 102 during a first time period. The downlink grant message 205 may schedule a PDSCH 210 (e.g., downlink traffic) from the base station 102 to the UE 104. In some aspects, the downlink grant message 205 may also include an A-CSI request field which may be used to schedule the CSI-RS 215 with slot offset X (i.e., "X slot" illustrated in FIG. 2). Thus, the x slot offset may refer to the gap (or number of slots) between receiving the PDCCH carrying the downlink grant message 205 and the reception of the CSI-RS 215. In some aspects, the number of slots (e.g., x slots) may be RRC configured for each CSI-RS resource. The UE 104 may utilize the CSI-RS to measure the channel conditions between the base station 102 and the UE 104. For example, an RRC parameter may be used to identify the trigger offset of the CSI-RS resource 215 that may be used when the CSI resource is triggered by a DL grant (e.g., "aperiodicTriggeringOffsetByDL_DCI").

The downlink grant message 205 may also include scheduling information regarding the transmission of A-CSI report by the UE on PUSCH 225 with slot offset Y. In other words, the base station 102 may indicate to the UE 104 the number of slots (Y slots) to wait after reception of the PDCCH carrying the downlink grant message 205 and the A-CSI reporting on PUSCH 225.

Thus, upon receiving the downlink grant message 205 from the base station 102 that includes A-CSI request field, the UE 104 may generate a A-CSI report to provide feedback to the base station. In some examples, a radio resource control (RRC) parameter (e.g., "reportConfigType") may be configured for one or more CSI-report configuration(s). The RRC parameter may indicate one or more of the types of CSI report that the UE may generate, including periodic CSI reports, semi-persistent CSI reports for transmission on PUSCH, semi persistent CSI reports for transmission on PUCCH, or aperiodic CSI reports.

In some aspects, an additional CSI report configuration types (e.g., "AperiodicOnPUSCH-by-DCI-format-1_1," "Aperiodic-by-DCI-format-1_2," "Aperiodic-by-DCI-format1_1-1-2) may utilized to indicate that the CSI report configuration is for A-CSI report on PUSCH triggered by the downlink grant. For example, as noted above, the "AperiodicOnPUSCH-by-DCI-format-1_1" CSI report configuration may be triggered by the base station using DCI format 1_1, while the "AperiodicOnPUSCH-by-DCI-format-1-2" may be triggered by DCI format 1_2. Additionally or alternatively, "AperiodicOnPUSCH-by-DCI-format1_1-1-2" or "AperiodicOnPUSCH-by-downlink-DCI" may be triggered by both DCI formats 1_1 and 1_2.

In some aspects, the additional CSI report configuration types may be triggered only by the downlink grant and restricted from being used for uplink grant. In some aspects, for this additional CSI report configuration types, additional RRC parameters may be configured for every CSI report configuration. For example, an A-CSI report offset, a PUSCH resource used to transmit A-CSI, and/or beta factor (e.g., used for the UE to determine the coding rate for the A-CSI from the coding rate/MCS of the PUSCH) may be configured.

In some aspects, one or more of the following parameters may be configured for the PUSCH resources: frequency-Hopping, DMRS-Configuration, mcs-Table, resourceAllocation type {resourceAllocationType0, resourceAllocationType1}, rbg-Size, open-loop power control parameter: P0 and alpha, power control loop for closed-loop power control, transformPrecoder (i.e., whether to use DFT-S-OFDM or CP-OFDM), repetition factor, RV sequence in case repetition, time-domain resource allocation (within a slot), frequency-domain resource allocation, antenna port, DMRS sequence initialization, precoder and number of layers, frequency-hopping-offset, MCS, and/or SRS resource indicator. In some aspects the PUSCH may be configured in a same serving cell as the cell where the downlink grant is received by the UE. In some aspects, the PUSCH resource may be limited only to resources on the Pcell and/or the Pscell. Additionally or alternatively, one or more parameters noted above may be configured for a PUSCH resource.

Thus, in some aspects, the UE 104 may determine the X slot (e.g., gap between reception of the downlink grant message 205 and the CSI-RS 210 transmission) based on one or more parameters included in the RRC. The UE 104 may also determine the Y slot (e.g., gap between reception of the downlink grant message 205 and the scheduled uplink transmission of A-CSI report on the PUSCH 225) from the one or more parameters identified above in the RRC. Additionally, the UE 104 may determine the PUSCH resources to transmit the A-CSI reports based on the RRC configured PURSCH resources (e.g., either new PUSCH resources configured by the corresponding parameters, or an existing CG PUSCH, whose index is associated with the A-CSI report.).

Specifically, in some aspects, instead of configuring new parameters for the PUSCH resource, the base station may configure an index for a configured grant (CG) PUSCH transmission for a A-CSI report on PUSCH configuration. In such instance, the UE may follow the parameters of the configured CG PUSCH to transmit the A-CSI on PUSCH. Specifically, in new radio, a UE may be configured with one or more PUSCH(s) with configured grant(s) where all transmission parameters are RRC configured for the PUSCH(s) transmissions. By using the CG PUSCH to transmit A-CSI, the gNB may avoid configure all the parameters discussed above, thereby saving resources and reducing implementation complexities.

In some examples, a single CSI resource setting may be associated with both uplink grant and downlink grant. In such scenario, a RRC parameter may be used to identify the trigger offset of the CSI-RS resource that may be used when the CSI resource is triggered by a DL grant (e.g., aperiodicTriggeringOffsetByDL_DCI). Alternatively, the base station may reuse the existing aperiodicTriggeringOffset (as for UL grant triggered A-CSI reports).

In some aspects, the HARQ process corresponding to the PUSCH transmission can be either RRC configured in the corresponding CSI-report configuration, dynamically indicated by the DL grant (e.g., reusing the same HARQ process as the DL HARQ process for the PUSCH transmission), or implicitly determined by the UE as a function of the slot on which the PUSCH is transmitted. In other scenarios where the PUSCH may also contains data, the retransmission of the data on PUSCH can be scheduled by an uplink grant DCI scrambled by a C-RNTI or a CS-RNTI and with the same HARQ process number as the HARQ process number as the initial transmission. In some aspects, the UE may be prevented from transmitting any data on the PUSCH 225 during the transmission of the A-CSI report. In other words, in some scenarios, the PUSCH may only be used to transmit A-CSI 225, while other transmissions (e.g., HARQ-ACK 220) may be transmitted separately.

Figure 3:
FIG. 3 is a timing diagram of an example of power control for A-CSI report transmission on PUSCH in accordance with aspects of the present disclosure.

FIG. 3 is a timing diagram 300 of an example of power control for A-CSI report transmission on PUSCH. Particularly, as noted above, aspects of the present disclosure also provide techniques for controlling the power for A-CSI transmission on PUSCH by the UE 104. For example, downlink grants 305 may contain a 2-bit TPC field that may be used by the base station 102 to indicate the transmit power for the PUSCH carrying HARQ-ACK feedback 310. In some instances, the same 2-bit TPC field in DCI may apply to both the PUCCH transmissions for HARQ-ACK 310 and the PUSCH transmissions for A-CSI report 315. In other examples, separate TPC fields can be configured for the power control for HARQ-ACK 310 and A-CSI 315. In such situations, the TPC for A-CSI may be used to indicate the closed-loop power control command for the A-CSI on PUSCH 315.

As noted above, in some aspects, the UE may be configured to restrict transmission of at most one A-CSI on PUSCH in a slot (e.g., transmission opportunity). In other instances, the UE may be restricted to receive at most one downlink grant 305 on any one slot which triggers A-CSI on PUSCH 315 in order to minimize possible collisions of multiple uplink transmissions on a single transmission opportunity.

For example, the UE may be restricted from being scheduled/triggered to transmit more than one A-CSI reports in a slot across all configured UL serving cells. This may include transmission for both downlink grant triggered A-CSI reports on PUSCH and uplink grant triggered A-CSI reports on PUSCH.

Figure 4:
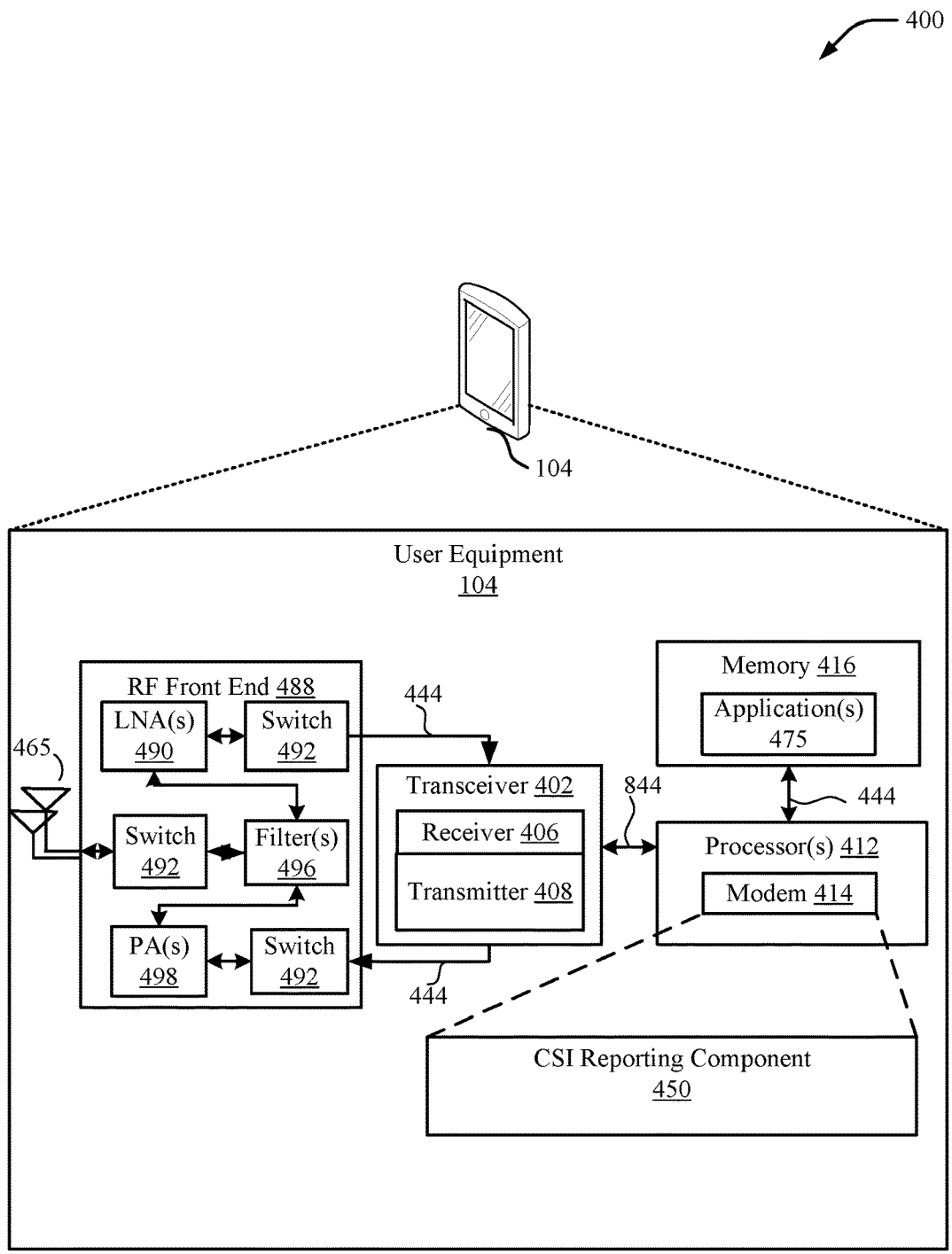
FIG. 4 is a schematic diagram of an example implementation of various components of a user equipment in accordance with various aspects of the present disclosure.

FIG. 4 illustrates a hardware components and subcomponents of a device that may be a UE 104 for implementing one or more methods (e.g., method 500) described herein in accordance with various aspects of the present disclosure. For example, one example of an implementation of the UE 104 may include a variety of components, some of which have already been described above, but including components such as one or more processors 412, memory 416 and transceiver 402 in communication via one or more buses 444, which may operate in conjunction with the CSI reporting component 450 to perform functions described herein related to including one or more methods (e.g., 500) of the present disclosure.

The one or more processors 412, modem 414, memory 416, transceiver 402, RF front end 488 and one or more antennas 465, may be configured to support voice and/or data calls (simultaneously or non-simultaneously) in one or more radio access technologies. In an aspect, the one or more processors 412 can include a modem 414 that uses one or more modem processors. The various functions related to CSI reporting component 450 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with CSI reporting component 450 may be performed by transceiver 402.

The memory 416 may be configured to store data used herein and/or local versions of application(s) 475 or CSI reporting component 450 and/or one or more of its subcomponents being executed by at least one processor 412. The memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining CSI reporting component 450 and/or one or more of its subcomponents, and/or data associated therewith, when the UE 104 is operating at least one processor 412 to execute CSI reporting component 450 and/or one or more of its subcomponents.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 406 may receive signals transmitted by at least one UE 104.

Additionally, receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 408 may including, but is not limited to, an RF transmitter.

Moreover, in an aspect, transmitting device may include the RF front end 488, which may operate in communication with one or more antennas 465 and transceiver 402 for receiving and transmitting radio transmissions, for example, wireless communications transmitted by at least one base station 102 or wireless transmissions transmitted by UE 104. The RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, the LNA 490 can amplify a received signal at a desired output level. In an aspect, each LNA 490 may have a specified minimum and maximum gain values. In an aspect, the RF front end 488 may use one or more switches 492 to select a particular LNA 490 and its specified gain value based on a desired gain value for a particular application.

Further, for example, one or more PA(s) 498 may be used by the RF front end 488 to amplify a signal for an RF output at a desired output power level. In an aspect, each PA 498 may have specified minimum and maximum gain values. In an aspect, the RF front end 488 may use one or more switches 492 to select a particular PA 498 and its specified gain value based on a desired gain value for a particular application.

Also, for example, one or more filters 496 can be used by the RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, the RF front end 488 can use one or more switches 492 to select a transmit or receive path using a specified filter 496, LNA 490, and/or PA 498, based on a configuration as specified by the transceiver 402 and/or processor 412.

As such, the transceiver 402 may be configured to transmit and receive wireless signals through one or more antennas 465 via the RF front end 488. In an aspect, the transceiver 402 may be tuned to operate at specified frequencies such that transmitting device can communicate with, for example, one or more base stations 102 or one or more cells associated with one or more base stations 102 or other UEs 104. In an aspect, for example, the modem 414 can configure the transceiver 402 to operate at a specified frequency and power level based on the configuration of the transmitting device and the communication protocol used by the modem 414.

In an aspect, the modem 414 can be a multiband-multimode modem, which can process digital data and communicate with the transceiver 402 such that the digital data is sent and received using the transceiver 402. In an aspect, the modem 414 can be multiband and be configured to support multiple frequency bands for a specific communications protocol. In an aspect, the modem 414 can be multimode and be configured to support multiple operating networks and communications protocols. In an aspect, the modem 414 can control one or more components of transmitting device (e.g., RF front end 488, transceiver 402) to enable transmission and/or reception of signals from the network based on a specified modem configuration. In an aspect, the modem configuration can be based on the mode of the modem 414 and the frequency band in use. In another aspect, the modem configuration can be based on UE configuration information associated with transmitting device as provided by the network during cell selection and/or cell reselection.

Figure 5:
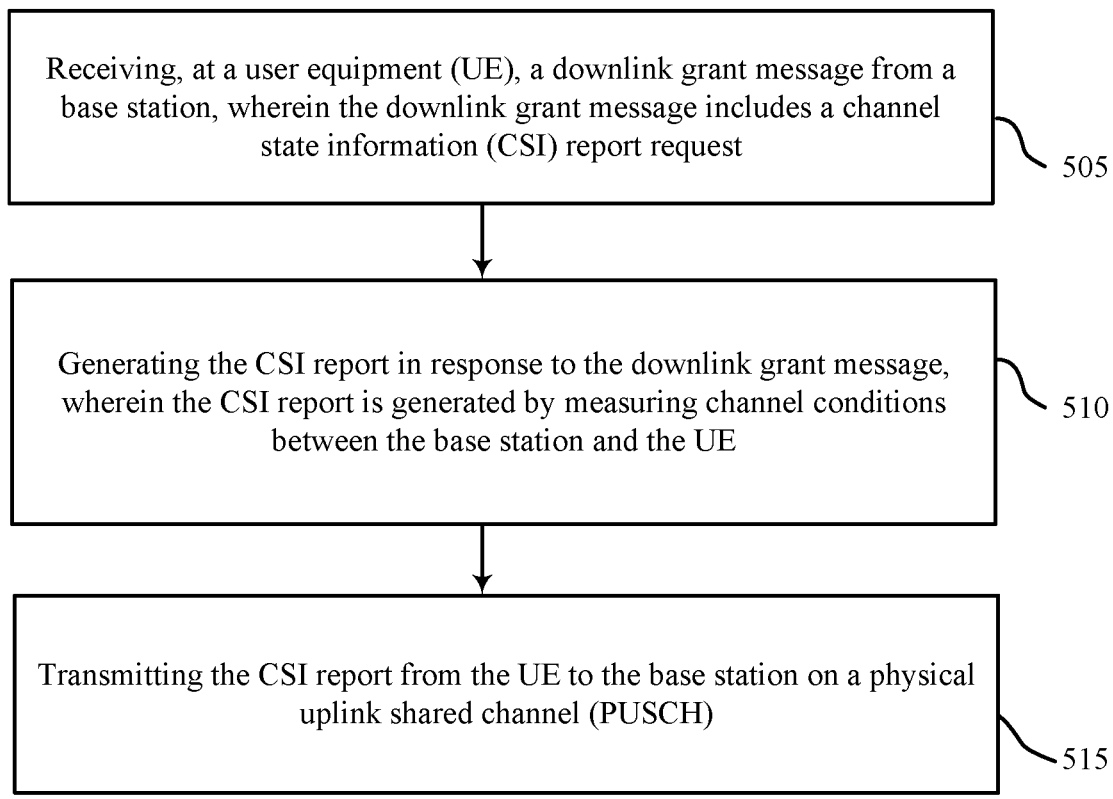
FIG. 5 is a flow diagram of an example of a method of wireless communication implemented by the UE in accordance with aspects of the present disclosure.

Referring to FIG. 5, an example method 500 for wireless communications in accordance with aspects of the present disclosure may be performed by one or more UEs 104 discussed with reference to FIGS. 1 and 4. Although the method 500 is described below with respect to the elements of the UE 104, other components may be used to implement one or more of the steps described herein.

At block 505, the method 500 may include receiving, at a user equipment (UE), a downlink grant message from a base station, wherein the downlink grant message includes a channel state information (CSI) report request. In some examples, the CSI report request may be included in a CSI request field that is part of the downlink grant message to trigger the CSI report transmission over the PUSCH and the CSI request field may include a codepoint to indicate a CSI report configuration from a plurality of CSI report configurations. Specifically, each codepoint (except the all 0 codepoint) of the A-CSI request field may indicate a particular A-CSI report configuration that includes one or more CSI resources. The all "0" codepoint may signal to the UE that no A-CSI report is requested by a particular downlink grant message transmitted by the base station to the one or more UEs. In some aspects, the UE may be configured with a list of CSI report configurations for transmitting the CSI report on PUSCH, each of the CSI report configurations associated with one or more CSI resources. The list of CSI report configurations may include at least one CSI report configuration indicating that the CSI report request is for an aperiodic CSI report on PUSCH that is triggered by the downlink grant message.

In some aspects, the at least one CSI report configuration may indicate that the CSI report request is for the aperiodic CSI (A-CSI) report. In such examples, the UE, in response to determining that the CSI report request is for the A-CSI report, may be prevented from transmitting any additional data on the PUSCH during the transmission of the A-CSI report other than transmissions necessary for the A-CSI report.

The CSI report configurations associated with one or more CSI resources may also include at least one CSI resource setting that is associated with both the downlink grant message and an uplink grant message. In some aspects, the downlink grant message further may include a transmit power control (TPC) setting to identify transmission power for one or both of transmitting the CSI report on the PUSCH and an uplink message on physical uplink control channel (PUCCH). In other aspects, the downlink grant message may include a first transmit power control (TPC) setting to identify transmission power for transmitting the CSI report on the PUSCH and a second TPC setting for transmission of uplink message on physical uplink control channel (PUCCH).

The UE may also be restricted from transmitting more than one aperiodic CSI (A-CSI) report in a single slot across a plurality of configured uplink serving cells. Aspects of block 505 may be performed by the transceiver 402 and CSI reporting component 450 as described with reference to FIG. 4. Thus, CSI reporting component 450, transceiver 402, one or more antennas 465, modem 414, processor 412, and/or the UE 104 or one of its subcomponents may define the means for receiving, at a user equipment (UE), a downlink grant message from a base station, wherein the downlink grant message includes a channel state information (CSI) report request.

At block 510, the method 500 may include generating the CSI report in response to the downlink grant message, wherein the CSI report is generated by measuring channel conditions between the base station and the UE. In some examples, generating the CSI report may include determining that the downlink grant message is received on a first downlink serving cell from the base station, and generating the CSI report for CSI resources on a second downlink serving cell.

In other examples, generating the CSI report may include configuring the UE to associate a plurality of CSI-report configurations to a single CSI trigger state, and generating a plurality of CSI reports for a plurality of downlink serving cells in response to the downlink grant message received from a base station. Aspects of block 510 may be performed by the CSI reporting component 450 as described with reference to FIG. 4. Thus, CSI reporting component 450, one or more antennas 465, modem 414, processor 412, and/or the UE 104 or one of its subcomponents may define the means for generating the CSI report in response to the downlink grant message, wherein the CSI report is generated by measuring channel conditions between the base station and the UE.

At block 515, the method 500 may include transmitting the CSI report from the UE to the base station on a physical uplink shared channel (PUSCH). Transmitting the CSI report may include identifying an index of configured grant PUSCH that are configured by the base station, and transmitting the CSI report from the UE to the base station on the configured grant PUSCH with the index of the configured grant. Aspects of block 515 may be performed by the transceiver 402 and CSI reporting component 450 as described with reference to FIG. 4. Thus, CSI reporting component 450, transceiver 402, one or more antennas 465, modem 414, processor 412, and/or the UE 104 or one of its subcomponents may define the means for transmitting the CSI report from the UE to the base station on a PUSCH.

Figure 6:
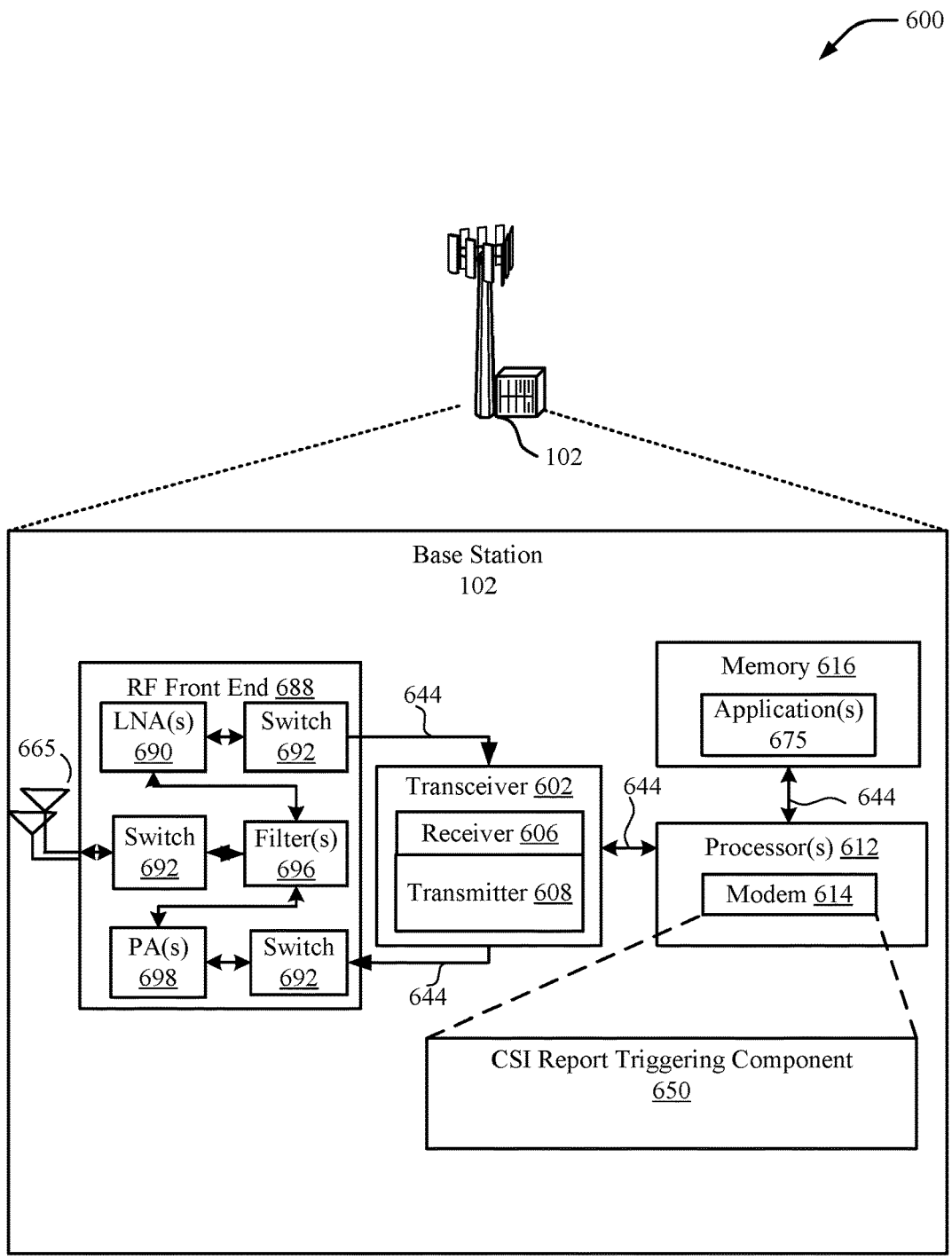
FIG. 6 is a schematic diagram of an example implementation of various components of a base station in accordance with various aspects of the present disclosure.

FIG. 6 illustrates a hardware components and subcomponents of a device that may be a base station 102 for implementing one or more methods (e.g., method 700) described herein in accordance with various aspects of the present disclosure. For example, one example of an implementation of the base station 102 may include a variety of components, some of which have already been described above, but including components such as one or more processors 612, memory 616 and transceiver 602 in communication via one or more buses 644, which may operate in conjunction with the CSI report triggering component 650 to perform functions described herein related to including one or more methods (e.g., 700) of the present disclosure.

The one or more processors 612, modem 614, memory 616, transceiver 602, RF front end 688 and one or more antennas 665, may be configured to support voice and/or data calls (simultaneously or non-simultaneously) in one or more radio access technologies. In an aspect, the one or more processors 612 can include a modem 614 that uses one or more modem processors. The various functions related to CSI report triggering component 650 may be included in modem 614 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 614 associated with CSI report triggering component 650 may be performed by transceiver 602.

The memory 616 may be configured to store data used herein and/or local versions of application(s) 675 or CSI report triggering component 650 and/or one or more of its subcomponents being executed by at least one processor 612. The memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, the memory 616 may be a non-transitory computer-readable storage medium that stores one or more computer-executable codes defining CSI report triggering component 650 and/or one or more of its subcomponents, and/or data associated therewith, when the base station 102 is operating at least one processor 612 to execute CSI report triggering component 650 and/or one or more of its subcomponents.

The transceiver 602 may include at least one receiver 606 and at least one transmitter 608. The receiver 606 may include hardware, firmware, and/or software code executable by a processor for receiving data, the code comprising instructions and being stored in a memory (e.g., computer-readable medium). The receiver 606 may be, for example, a radio frequency (RF) receiver. In an aspect, the receiver 606 may receive signals transmitted by at least one UE 104. Additionally, receiver 606 may process such received signals, and also may obtain measurements of the signals, such as, but not limited to, Ec/Io, SNR, RSRP, RSSI, etc. The transmitter 608 may include hardware, firmware, and/or software code executable by a processor for transmitting data, the code comprising instructions and being stored in a memory (e.g., computer-readable medium). A suitable example of the transmitter 608 may including, but is not limited to, an RF transmitter.

Moreover, in an aspect, transmitting device may include the RF front end 688, which may operate in communication with one or more antennas 665 and transceiver 602 for receiving and transmitting radio transmissions, for example, wireless communications transmitted by at least one base station 102 or wireless transmissions transmitted by UE 104. The RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, the LNA 690 can amplify a received signal at a desired output level. In an aspect, each LNA 690 may have a specified minimum and maximum gain values. In an aspect, the RF front end 688 may use one or more switches 692 to select a particular LNA 690 and its specified gain value based on a desired gain value for a particular application.

Further, for example, one or more PA(s) 698 may be used by the RF front end 1088 to amplify a signal for an RF output at a desired output power level. In an aspect, each PA 698 may have specified minimum and maximum gain values. In an aspect, the RF front end 688 may use one or more switches 692 to select a particular PA 698 and its specified gain value based on a desired gain value for a particular application.

Also, for example, one or more filters 696 can be used by the RF front end 688 to filter a received signal to obtain an input RF signal. Similarly, in an aspect, for example, a respective filter 696 can be used to filter an output from a respective PA 698 to produce an output signal for transmission. In an aspect, each filter 1096 can be connected to a specific LNA 690 and/or PA 698. In an aspect, the RF front end 688 can use one or more switches 692 to select a transmit or receive path using a specified filter 696, LNA 690, and/or PA 698, based on a configuration as specified by the transceiver 602 and/or processor 612.

As such, the transceiver 602 may be configured to transmit and receive wireless signals through one or more antennas 665 via the RF front end 688. In an aspect, the transceiver 602 may be tuned to operate at specified frequencies such that transmitting device can communicate with, for example, one or more base stations 102 or one or more cells associated with one or more base stations 102 or other UEs 104. In an aspect, for example, the modem 614 can configure the transceiver 602 to operate at a specified frequency and power level based on the configuration of the transmitting device and the communication protocol used by the modem 614.

In an aspect, the modem 614 can be a multiband-multimode modem, which can process digital data and communicate with the transceiver 602 such that the digital data is sent and received using the transceiver 602. In an aspect, the modem 614 can be multiband and be configured to support multiple frequency bands for a specific communications protocol. In an aspect, the modem 614 can be multimode and be configured to support multiple operating networks and communications protocols. In an aspect, the modem 614 can control one or more components of transmitting device (e.g., RF front end 688, transceiver 602) to enable transmission and/or reception of signals from the network based on a specified modem configuration. In an aspect, the modem configuration can be based on the mode of the modem 614 and the frequency band in use. In another aspect, the modem configuration can be based on base station configuration information associated with transmitting device as provided by the network during cell selection and/or cell reselection.

Figure 7:
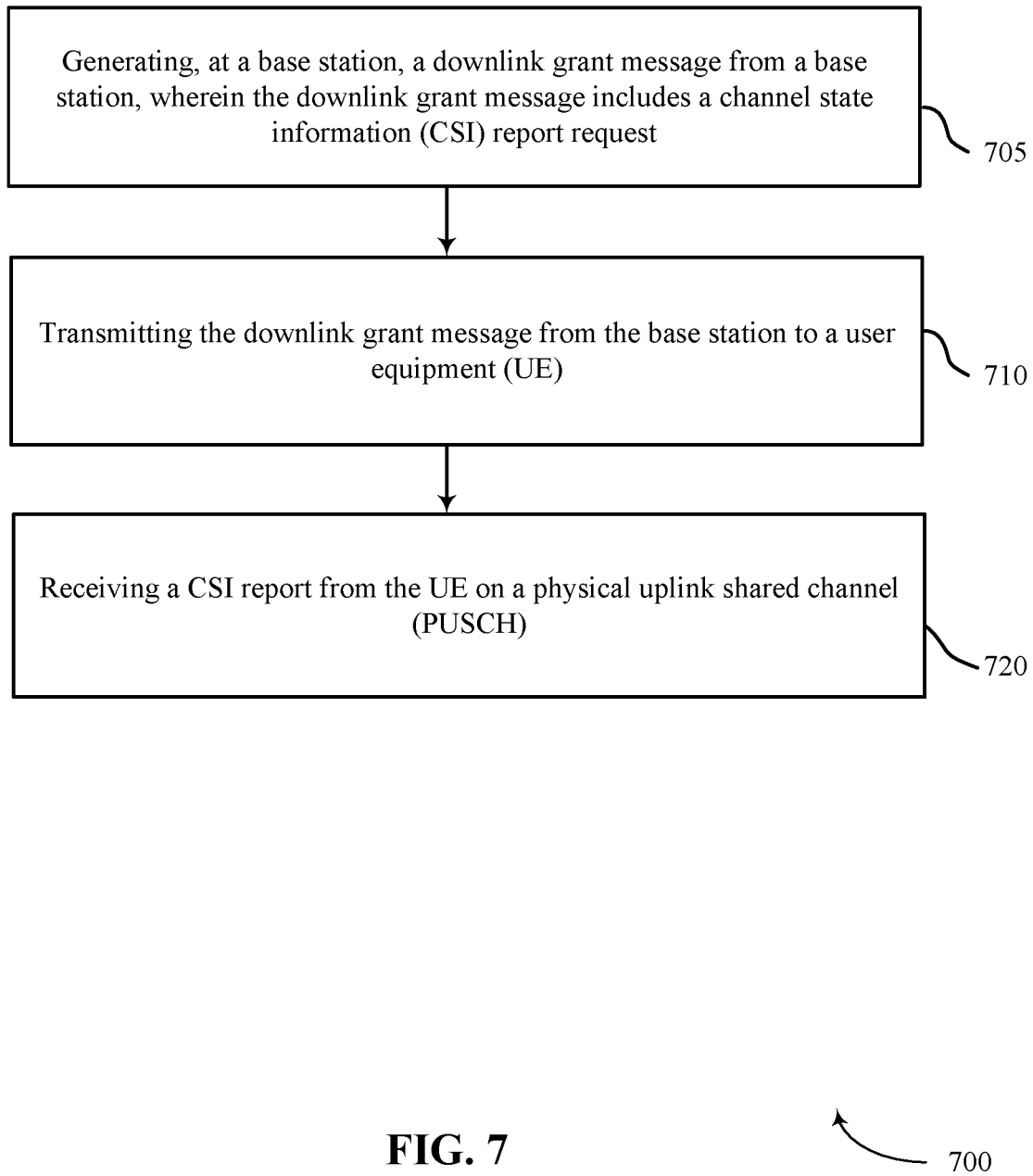
FIG. 7 is a flow diagram of an example of a method of wireless communication implemented by the base station in accordance with aspects of the present disclosure.

Referring to FIG. 7, an example method 700 for wireless communications in accordance with aspects of the present disclosure may be performed by one or more base stations 102 discussed with reference to FIGS. 1 and 6. Although the method 700 is described below with respect to the elements of the base station 102, other components may be used to implement one or more of the steps described herein.

At block 705, the method 700 may include generating, at a base station, a downlink grant message from a base station, wherein the downlink grant message includes a CSI report request. In some examples, the CSI report request may be included in a CSI request field that is part of the downlink grant message to trigger the CSI report transmission over the PUSCH. In some aspects, the base station may also configure UE with a list of CSI report configurations for transmitting the CSI report on PUSCH, each of the CSI report configurations associated with one or more CSI resources. The list of CSI report configurations may include at least one CSI report configuration indicating that the CSI report request is for an aperiodic CSI report on PUSCH that is triggered by the downlink grant message. In some aspects, the at least one CSI report configuration may indicate that the CSI report request is for the aperiodic CSI report on PUSCH is prevented from being triggered by an uplink grant message from the base station. The CSI report configurations associated with one or more CSI resources may include at least one CSI resource setting that is associated with both the downlink grant message and an uplink grant message. Aspects of block 705 may be performed by the CSI report triggering component 650 as described with reference to FIG. 6. Thus, CSI report triggering component 650, one or more antennas 665, modem 614, processor 612, and/or the base station 102 or one of its subcomponents may define the means for generating, at a base station, a downlink grant message from a base station.

At block 710, the method 700 may include transmitting the downlink grant message from the base station to a UE. In some aspects, the downlink grant message further may include a transmit power control (TPC) setting to identify transmission power for one or both of transmitting the CSI report on the PUSCH and an uplink message on physical uplink control channel (PUCCH). In other aspects, the downlink grant message may include a first transmit power control (TPC) setting to identify transmission power for transmitting the CSI report on the PUSCH and a second TPC setting for transmission of uplink message on physical uplink control channel (PUCCH).

Aspects of block 710 may be performed by the transceiver 602 and CSI report triggering component 650 as described with reference to FIG. 6. Thus, CSI report triggering component 650, transceiver 602, one or more antennas 665, modem 614, processor 612, and/or the base station 102 or one of its subcomponents may define the means for transmitting the downlink grant message from the base station to a UE.

At block 715, the method 700 may include receiving a CSI report from the UE on a PUSCH. Aspects of block 715 may be performed by the transceiver 602 and CSI report triggering component 650 as described with reference to FIG. 6. Thus, CSI report triggering component 650, transceiver 602, one or more antennas 665, modem 614, processor 612, and/or the base station 102 or one of its subcomponents may define the means for receiving a CSI report from the UE on a PUSCH.

SOME FURTHER EXAMPLE CLAUSES

Implementation examples are described in the following numbered clauses:

1. A method for wireless communications, comprising:
   receiving, at a user equipment (UE), a downlink grant message from a base station, wherein the downlink grant message includes a channel state information (CSI) report request;
   generating the CSI report in response to the downlink grant message, wherein the CSI report is generated by measuring channel conditions between the base station and the UE; and
   transmitting the CSI report from the UE to the base station on a physical uplink shared channel (PUSCH).

2. The method of clause 1, wherein the CSI report request is included in a CSI request field that is part of the downlink grant message and triggers transmission of the CSI report over the PUSCH, and
   wherein the CSI request field includes at least one codepoint to indicate a CSI report configuration from a plurality of CSI report configurations.

3. The method of any of the preceding clauses 1-2, wherein the UE is configured with a list of CSI report configurations for transmitting the CSI report on PUSCH, each of the CSI report configurations associated with one or more CSI resources.

4. The method of any of the preceding clauses 1-3, wherein the list of CSI report configurations includes at least one CSI report configuration indicating that the CSI report request is for an aperiodic CSI (A-CSI) report on PUSCH that is triggered by the downlink grant message.

5. The method of any of the preceding clauses 1-4, wherein the UE, in response to determining that the CSI report request is for the A-CSI report, is prevented from transmitting any additional data on the PUSCH during the transmission of the A-CSI report.

6. The method of any of the preceding clauses 1-5, wherein the CSI report configurations associated with one or more CSI resources includes at least one CSI resource setting that is associated with both the downlink grant message and an uplink grant message.

7. The method of any of the preceding clauses 1-6, wherein the CSI report configurations are associated with one or more radio resource control (RRC) parameters that indicate one or more of CSI report offsets between reception of the downlink grant message and scheduling of CSI reporting slot, PUSCH resources used to transmit the CSI report, or a beta factor used to determine coding rate for transmission of the CSI report.

8. The method of any of the preceding clauses 1-7, wherein the one or more RRC parameters provides a trigger offset identifying a gap between reception of the downlink grant message and a CSI-reference signal from the base station.

9. The method of any of the preceding clauses 1-8, wherein the one or more RRC parameters include one or more of frequency hopping, demodulation reference signal (DMRS)-Configuration, modulation and coding scheme (MCS) table, resource allocation type, resource block group size, open-loop power control parameter, power control loop for closed-loop power control, transform precoder, repetition factor, redundancy version (rv) sequence, time-domain resource allocation, frequency-domain resource allocation, antenna port, DMRS sequence initialization, precoder and number of layers, frequency-hopping-offset, MCS resource indicator, or SRS resource indicator.

10. The method of any of the preceding clauses 1-9, wherein transmitting the CSI report from the UE to the base station on the PUSCH, comprises:
determining that the downlink grant message is received at the UE in a serving cell; and
transmitting the CSI report from the UE on the PUSCH in the serving cell that is same cell on which the downlink grant message is received.

11. The method of any of the preceding clauses 1-10, wherein transmitting the CSI report from the UE to the base station on the PUSCH, comprises:
transmitting the CSI report on one of a primary cell (Pcell) or primary SCell (Pscell).

12. The method of any of the preceding clauses 1-11, wherein generating the CSI report in response to the downlink grant message comprises:
determining that the downlink grant message is received on a first downlink serving cell from the base station; and
generating the CSI report for CSI resources on a second downlink serving cell.

13. The method of any of the preceding clauses 1-12, wherein generating the CSI report in response to the downlink grant message comprises:
configuring the UE to associate a plurality of CSI-report configurations to a single CSI trigger state; and
generating a plurality of CSI reports for a plurality of downlink serving cells in response to the downlink grant message received from a base station.

14. The method of any of the preceding clauses 1-13, wherein transmitting the CSI report from the UE to the base station comprises:
identifying an index of a configured grant PUSCH that is configured by the base station; and
transmitting the CSI report from the UE to the base station on the configured grant PUSCH associated with the index of the configured grant.

15. The method of any of the preceding clauses 1-14, wherein the downlink grant message further includes a transmit power control (TPC) setting to identify transmission power for one or both of transmitting the CSI report on the PUSCH and an uplink message on physical uplink control channel (PUCCH).

16. The method of any of the preceding clauses 1-15, wherein the downlink grant message further includes a first transmit power control (TPC) setting to identify transmission power for transmitting the CSI report on the PUSCH and a second TPC setting for transmission of uplink message on physical uplink control channel (PUCCH).

17. The method of any of the preceding clauses 1-16, wherein the UE is restricted from transmitting more than one aperiodic CSI (A-CSI) report on PUSCH in a single slot across a plurality of configured uplink serving cells.

18. The method of any of the preceding clauses 1-17, wherein the A-CSI report on PUSCH includes one or both of the downlink grant message or an uplink grant message triggered A-CSI on PUSCH.

19. The method of any of the preceding clauses 1-18, wherein the downlink grant message schedules a downlink data transmission from the base station to the UE.

20. An apparatus for wireless communications, comprising:
at least one processor;
and memory coupled with the at least one processor, the memory including instructions executable by the at least one processor to cause the apparatus to:
receive, at a user equipment (UE), a downlink grant message from a base station, wherein the downlink grant message includes a channel state information (CSI) report request;
generate the CSI report in response to the downlink grant message, wherein the CSI report is generated by measuring channel conditions between the base station and the UE; and
transmit the CSI report from the UE to the base station on a physical uplink shared channel (PUSCH).

21. The apparatus of clause 20, wherein the CSI report request is included in a CSI request field that is part of the downlink grant message and triggers transmission of the CSI report over the PUSCH, and
wherein the CSI request field includes at least one codepoint to indicate a CSI report configuration from a plurality of CSI report configurations.

22. The apparatus of any of the preceding clauses 20-21, wherein the UE is configured with a list of CSI report configurations for transmitting the CSI report on PUSCH, each of the CSI report configurations associated with one or more CSI resources.

23. The apparatus of any of the preceding clauses 20-22, wherein the list of CSI report configurations includes at least one CSI report configuration indicating that the CSI report request is for an aperiodic CSI report on PUSCH that is triggered by the downlink grant message.

24. The apparatus of any of the preceding clauses 20-23, wherein the at least one CSI report configuration indicating that the CSI report request is for the aperiodic CSI report on PUSCH is prevented from being triggered by an uplink grant message from the base station.

25. The apparatus of any of the preceding clauses 20-24, wherein the CSI report configurations associated with one or more CSI resources includes at least one CSI resource setting that is associated with both the downlink grant message and an uplink grant message.

26. The apparatus of any of the preceding clauses 20-25, wherein the CSI report configurations are associated with one or more radio resource control (RRC) parameters that indicate one or more of CSI report offsets between reception of the downlink grant message and scheduling of CSI reporting slot, PUSCH resources used to transmit the CSI report, or a beta factor used to determine coding rate for transmission of the CSI report.

27. The apparatus of any of the preceding clauses 20-26, wherein the one or more RRC parameters provides a trigger offset identifying a gap between reception of the downlink grant message and a CSI-reference signal from the base station.

28. The apparatus of any of the preceding clauses 20-27, wherein the one or more RRC parameters include one or more of frequency hopping, demodulation reference signal (DMRS)-Configuration, modulation and coding scheme (MC S) table, resource allocation type, resource block group size, open-loop power control parameter, power control loop for closed-loop power control, transform precoder, repetition factor, redundancy version (rv) sequence, time-domain resource allocation, frequency-domain resource allocation, antenna port, DMRS sequence initialization, precoder and number of layers, frequency-hopping-offset, MCS resource indicator, or SRS resource indicator.

29. The apparatus of any of the preceding clauses 20-28, wherein the instructions to transmit the CSI report from the UE to the base station on the PUSCH are further executable by the at least one processor to cause the apparatus to:
determine that the downlink grant message is received at the UE in a serving cell; and
transmit the CSI report from the UE on the PUSCH in the serving cell that is same cell on which the downlink grant message is received.

30. The apparatus of any of the preceding clauses 20-29, wherein the instructions to transmit the CSI report from the UE to the base station on the PUSCH are further executable by the at least one processor to cause the apparatus to:
transmit the CSI report on one of a primary cell (Pcell) or primary SCell (Pscell).

31. The apparatus of any of the preceding clauses 20-30, wherein the instructions to generate the CSI report in response to the downlink grant message are further executable by the at least one processor to cause the apparatus to:
determine that the downlink grant message is received on a first downlink serving cell from the base station; and
generate the CSI report for CSI resources on a second downlink serving cell.

32. The apparatus of any of the preceding clauses 20-31, wherein the instructions to generate the CSI report in response to the downlink grant message are further executable by the at least one processor to cause the apparatus to:
configure the UE to associate a plurality of CSI-report configurations to a single CSI trigger state; and
generate a plurality of CSI reports for a plurality of downlink serving cells in response to the downlink grant message received from a base station.

33. The apparatus of any of the preceding clauses 20-32, wherein the instructions to transmit the CSI report from the UE to the base station are further executable by the processor to:
identify an index of a configured grant PUSCH that is configured by the base station; and
transmit the CSI report from the UE to the base station on the configured grant PUSCH associated with the index of the configured grant.

34. The apparatus of any of the preceding clauses 20-33, wherein the downlink grant message further includes a transmit power control (TPC) setting to identify transmission power for one or both of transmitting the CSI report on the PUSCH and an uplink message on physical uplink control channel (PUCCH).

35. The apparatus of any of the preceding clauses 20-34, wherein the downlink grant message further includes a first transmit power control (TPC) setting to identify transmission power for transmitting the CSI report on the PUSCH and a second TPC setting for transmission of uplink message on physical uplink control channel (PUCCH).

36. The apparatus of any of the preceding clauses 20-35, wherein the UE is restricted from transmitting more than one aperiodic CSI (A-CSI) report on PUSCH in a single slot across a plurality of configured uplink serving cells.

37. The apparatus of any of the preceding clauses 20-36, wherein the A-CSI report on PUSCH includes one or both of the downlink grant message or an uplink grant message triggered A-CSI on PUSCH.

38. The apparatus of any of the preceding clauses 20-37, wherein the downlink grant message schedules a downlink data transmission from the base station to the UE.

39. A method for wireless communications, comprising:
generating, at a base station, a downlink grant message from a base station, wherein the downlink grant message includes a channel state information (CSI) report request;
transmitting the downlink grant message from the base station to a user equipment (UE); and
receiving a CSI report from the UE on a physical uplink shared channel (PUSCH).

40. The method of clause 39, wherein the CSI report request is included in a CSI request field that is part of the downlink grant message and triggers transmission of the CSI report over the PUSCH.

41. The method of any of the preceding clauses 39-40, wherein the base station configures the UE with a list of CSI report configurations for transmitting the CSI report on PUSCH, each of the CSI report configurations associated with one or more CSI resources.

42. The method of any of the preceding clauses 39-40, wherein the list of CSI report configurations includes at least one CSI report configuration indicating that the CSI report request is for an aperiodic CSI report on PUSCH that is triggered by the downlink grant message.

43. The method of any of the preceding clauses 39-42, wherein the at least one CSI report configuration indicating that the CSI report request is for the aperiodic CSI report on PUSCH is prevented from being triggered by an uplink grant message from the base station.

44. The method of any of the preceding clauses 39-43, wherein the CSI report configurations associated with one or more CSI resources includes at least one CSI resource setting that is associated with both the downlink grant message and an uplink grant message.

45. The method of any of the preceding clauses 39-44, wherein the downlink grant message further includes a transmit power control (TPC) setting to identify transmission power for one or both of transmitting the CSI report on the PUSCH and an uplink message on physical uplink control channel (PUCCH).

46. The method of any of the preceding clauses 39-45, wherein the downlink grant message further includes a first transmit power control (TPC) setting to identify transmission power for transmitting the CSI report on the PUSCH and a second TPC setting for transmission of uplink message on physical uplink control channel (PUCCH).

47. An apparatus for wireless communications, comprising:
at least one processor;
and memory coupled with the at least one processor, the memory including instructions executable by the at least one processor to cause the apparatus to:
generate, at a base station, a downlink grant message from a base station, wherein the downlink grant message includes a channel state information (CSI) report request;
transmit the downlink grant message from the base station to a user equipment (UE); and
receive a CSI report from the UE on a physical uplink shared channel (PUSCH).

48. The apparatus of clause 47, wherein the CSI report request is included in a CSI request field that is part of the downlink grant message and triggers transmission of the CSI report over the PUSCH.

49. The apparatus of any of the preceding clauses 47-48, wherein the base station configures the UE with a list of CSI report configurations for transmitting the CSI report on PUSCH, each of the CSI report configurations associated with one or more CSI resources.

50. The apparatus of any of the preceding clauses 47-49, wherein the list of CSI report configurations includes at least one CSI report configuration indicating that the CSI report request is for an aperiodic CSI report on PUSCH that is triggered by the downlink grant message.

51. The apparatus of any of the preceding clauses 47-50, wherein the at least one CSI report configuration indicating that the CSI report request is for the aperiodic CSI report on PUSCH is prevented from being triggered by an uplink grant message from the base station.

52. The apparatus of any of the preceding clauses 47-51, wherein the CSI report configurations associated with one or more CSI resources includes at least one CSI resource setting that is associated with both the downlink grant message and an uplink grant message.

53. The apparatus of any of the preceding clauses 47-52, wherein the downlink grant message further includes a transmit power control (TPC) setting to identify transmission power for one or both of transmitting the CSI report on the PUSCH and an uplink message on physical uplink control channel (PUCCH).

54. The apparatus of any of the preceding clauses 47-53, wherein the downlink grant message further includes a first transmit power control (TPC) setting to identify transmission power for transmitting the CSI report on the PUSCH and a second TPC setting for transmission of uplink message on physical uplink control channel (PUCCH).

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
receiving, at a user equipment (UE), a downlink grant message from a base station, the downlink grant message comprising a CSI request field that includes a channel state information (CSI) report request for triggering transmission of a CSI report from the UE over a physical uplink shared channel (PUSCH), the CSI request field including at least one codepoint to indicate a CSI report configuration from a plurality of CSI report configurations, each of a subset of the plurality of the CSI report configurations including a plurality of parameters;
generating the CSI report in response to the downlink grant message in accordance with the CSI report configuration indicated by the codepoint, wherein the CSI report is generated by measuring channel conditions between the base station and the UE; and transmitting the CSI report from the UE to the base station on the PUSCH.

2. The method of claim 1, wherein the UE is configured with a list of CSI report configurations for transmitting the CSI report on PUSCH, each of the CSI report configurations associated with one or more CSI resources.

3. The method of claim 2, wherein the list of CSI report configurations includes at least one CSI report configuration indicating that the CSI report request is for an aperiodic CSI (A-CSI) report on PUSCH that is triggered by the downlink grant message.

4. The method of claim 3, wherein the UE, in response to determining that the CSI report request is for the A-CSI report, is prevented from transmitting any additional data on the PUSCH during the transmission of the A-CSI report.

5. The method of claim 2, wherein the CSI report configurations associated with one or more CSI resources includes at least one CSI resource setting that is associated with both the downlink grant message and an uplink grant message.

6. The method of claim 2, wherein the CSI report configurations are associated with one or more radio resource control (RRC) parameters that indicate one or more of CSI report offsets between reception of the downlink grant message and scheduling of CSI reporting slot, PUSCH resources used to transmit the CSI report, or a beta factor used to determine coding rate for transmission of the CSI report.

7. The method of claim 6, wherein the one or more RRC parameters provides a trigger offset identifying a gap between reception of the downlink grant message and a CSI-reference signal from the base station.

8. The method of claim 6, wherein the one or more RRC parameters include one or more of frequency hopping, demodulation reference signal (DMRS)-Configuration, modulation and coding scheme (MCS) table, resource allocation type, resource block group size, open-loop power control parameter, power control loop for closed-loop power control, transform precoder, repetition factor, redundancy version (rv) sequence, time-domain resource allocation, frequency-domain resource allocation, antenna port, DMRS sequence initialization, precoder and number of layers, frequency-hopping-offset, MCS resource indicator, or SRS resource indicator.

9. The method of claim 1, wherein transmitting the CSI report from the UE to the base station on the PUSCH, comprises:
determining that the downlink grant message is received at the UE in a serving cell; and
transmitting the CSI report from the UE on the PUSCH in the serving cell that is same cell on which the downlink grant message is received.

10. The method of claim 1, wherein transmitting the CSI report from the UE to the base station on the PUSCH, comprises:
transmitting the CSI report on one of a primary cell (Pcell) or primary SCell (Pscell).

11. The method of claim 1, wherein generating the CSI report in response to the downlink grant message comprises:
determining that the downlink grant message is received on a first downlink serving cell from the base station; and
generating the CSI report for CSI resources on a second downlink serving cell.

12. The method of claim 1, wherein generating the CSI report in response to the downlink grant message comprises:

configuring the UE to associate a plurality of CSI-report configurations to a single CSI trigger state; and
generating a plurality of CSI reports for a plurality of downlink serving cells in response to the downlink grant message received from a base station.

13. The method of claim 1, wherein transmitting the CSI report from the UE to the base station comprises:
identifying an index of a configured grant PUSCH that is configured by the base station; and
transmitting the CSI report from the UE to the base station on the configured grant PUSCH associated with the index of the configured grant.

14. The method of claim 1, wherein the downlink grant message further includes a transmit power control (TPC) setting to identify transmission power for one or both of transmitting the CSI report on the PUSCH and an uplink message on physical uplink control channel (PUCCH).

15. The method of claim 1, wherein the downlink grant message further includes a first transmit power control (TPC) setting to identify transmission power for transmitting the CSI report on the PUSCH and a second TPC setting for transmission of uplink message on physical uplink control channel (PUCCH).

16. The method of claim 1, wherein the UE is restricted from transmitting more than one aperiodic CSI (A-CSI) report on PUSCH in a single slot across a plurality of configured uplink serving cells.

17. The method of claim 16, wherein the A-CSI report on PUSCH includes one or both of the downlink grant message or an uplink grant message triggered A-CSI on PUSCH.

18. The method of claim 1, wherein the downlink grant message schedules a downlink data transmission from the base station to the UE.

19. An apparatus for wireless communications, comprising:
at least one processor; and
memory coupled with the at least one processor, the memory including instructions executable by the at least one processor, individually or in any combination, to cause the apparatus to:
receive, at a user equipment (UE), a downlink grant message from a base station, the downlink grant message comprising a CSI request field that includes a channel state information (CSI) report request for triggering transmission of a CSI report from the UE over a physical uplink shared channel (PUSCH), the CSI request field including at least one codepoint to indicate a CSI report configuration from a plurality of CSI report configurations, each of a subset of the plurality of the CSI report configurations including a plurality of parameters;
generate the CSI report in response to the downlink grant message in accordance with the CSI report configuration indicated by the codepoint, wherein the CSI report is generated by measuring channel conditions between the base station and the UE; and
transmit the CSI report from the UE to the base station on the PUSCH.

20. A method for wireless communications, comprising:
generating, at a base station, a downlink grant message from a base station, the downlink grant message comprising a CSI request field that includes a channel state information (CSI) report request for triggering transmission of a CSI report from a user equipment (UE) over a physical uplink shared channel (PUSCH), the CSI request field including at least one codepoint to indicate a CSI report configuration from a plurality of CSI report configurations, each of a subset of the plurality of the CSI report configurations including a plurality of parameters;

transmitting the downlink grant message from the base station to the UE; and receiving a CSI report message in accordance with the CSI report configuration indicated by the codepoint from the UE on the PUSCH.

21. The method of claim 20, wherein the base station configures the UE with a list of CSI report configurations for transmitting the CSI report on PUSCH, each of the CSI report configurations associated with one or more CSI resources.

22. The method of claim 21, wherein the list of CSI report configurations includes at least one CSI report configuration indicating that the CSI report request is for an aperiodic CSI report on PUSCH that is triggered by the downlink grant message.

23. The method of claim 21, wherein the at least one CSI report configuration indicating that the CSI report request is for aperiodic CSI (A-CSI) report on PUSCH.

24. The method of claim 21, wherein the CSI report configurations associated with one or more CSI resources includes at least one CSI resource setting that is associated with both the downlink grant message and an uplink grant message.

25. The method of claim 20, wherein the downlink grant message further includes a transmit power control (TPC) setting to identify transmission power for one or both of transmitting the CSI report on the PUSCH and an uplink message on physical uplink control channel (PUCCH).

26. The method of claim 20, wherein the downlink grant message further includes a first transmit power control (TPC) setting to identify transmission power for transmitting the CSI report on the PUSCH and a second TPC setting for transmission of uplink message on physical uplink control channel (PUCCH).

27. An apparatus for wireless communications, comprising:

at least one processor; and memory coupled to the at least one processor, the memory including instructions executable by the at least one processor, individually or in any combination, to cause the apparatus to:

generate, at a base station, a downlink grant message from a base station, the downlink grant message comprising a CSI request field that includes a channel state information (CSI) report request for triggering transmission of a CSI report from a user equipment (UE) over a physical uplink shared channel (PUSCH), the CSI request field including at least one codepoint to indicate a CSI report configuration from a plurality of CSI report configurations, each of a subset of the plurality of the CSI report configurations including a plurality of parameters;

transmit the downlink grant message from the base station to the UE; and receive a CSI report in accordance with the CSI report configuration indicated by the codepoint from the UE on the PUSCH.

* * * * *